No. 629,033. Patented July 18, 1899.
J. P. HALKET & J. KENNEDY.
SAFETY GEAR FOR LIFTS.
(Application filed Dec. 28, 1898.)

(No Model.) 6 Sheets—Sheet 1.

Witnesses:

Inventors:
James Pitcairn Halket
John Kennedy
By Richards
their Attorneys

No. 629,033. Patented July 18, 1899.
J. P. HALKET & J. KENNEDY.
SAFETY GEAR FOR LIFTS.
(Application filed Dec. 28, 1898.)
(No Model.) 6 Sheets—Sheet 2.

No. 629,033. Patented July 18, 1899.
J. P. HALKET & J. KENNEDY.
SAFETY GEAR FOR LIFTS.
(Application filed Dec. 28, 1898.)
(No Model.) 6 Sheets—Sheet 5.

No. 629,033. Patented July 18, 1899.
J. P. HALKET & J. KENNEDY.
SAFETY GEAR FOR LIFTS.
(Application filed Dec. 28, 1898.)
(No Model.) 6 Sheets—Sheet 6.

WITNESSES:
INVENTORS.
ATTORNEYS

UNITED STATES PATENT OFFICE.

JAMES P. HALKET AND JOHN KENNEDY, OF LONDON, ENGLAND.

SAFETY-GEAR FOR LIFTS.

SPECIFICATION forming part of Letters Patent No. 629,033, dated July 18, 1899.

Application filed December 28, 1898. Serial No. 700,510. (No model.)

*To all whom it may concern:*

Be it known that we, JAMES PITCAIRN HALKET, engineer, residing at 135 East India Dock road, Poplar, and JOHN KENNEDY, engineer, residing at 11 Fellows road, South Hampstead, London, in the county of Middlesex, England, subjects of the Queen of Great Britain and Ireland, have invented certain new and useful Improvements in Safety-Gears for Lifts, (for which we have filed an application for British Patent No. 12,360, dated June 1, 1898,) of which the following is a specification.

Our invention relates to improvements in safety-gears for lifts or hoists, and has for its object the prevention of a dangerously-rapid descent of the cage, whether due to bursting of the lift-pipes or the breaking of the supporting-rope or to any other cause.

Our invention consists in the construction and arrangement of parts hereinafter described, and particularly pointed out in the claims.

The cams may be brought into operation in other ways, such as by spring or gravity devices released by the breaking of the supporting-rope or by means of a governor driven from the cage.

In our improved appliance we do not depend on the sliding friction of the gripping-cams on the guides to bring the cage to rest gradually, and we prefer, indeed, that practically no such sliding should take place. We may also provide a governor of any known kind to bring the cams into engagement with the guides in case of a dangerously high downward velocity being acquired by the cage gradually.

Figure 1:
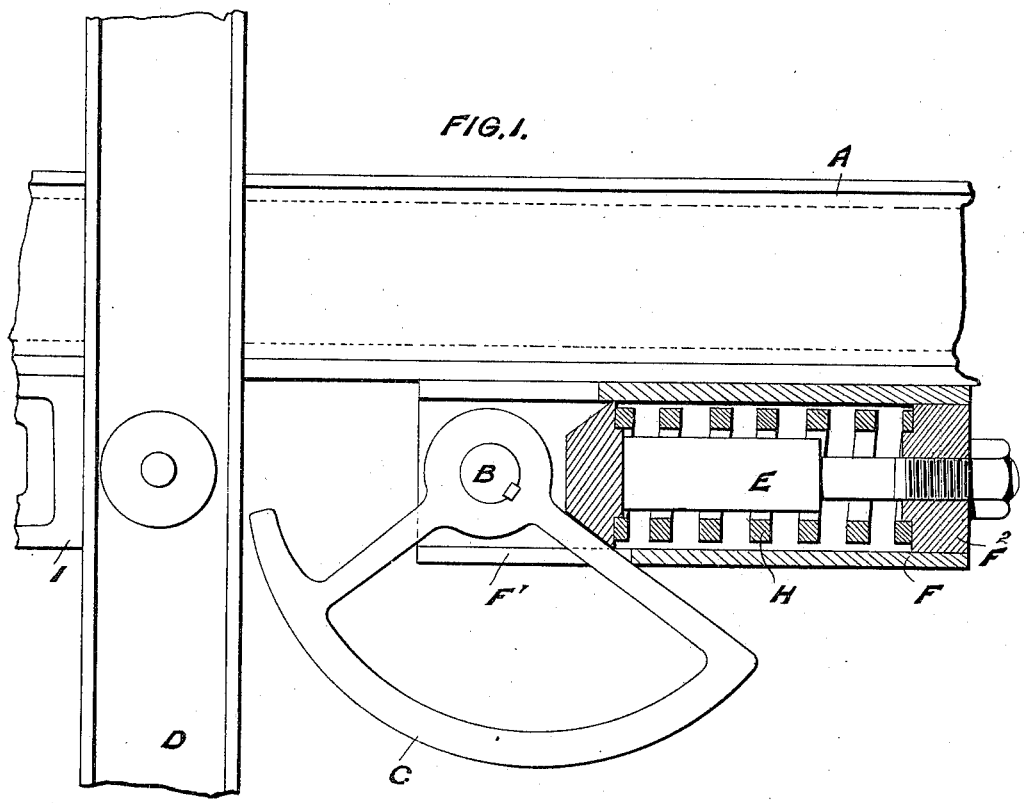
Figure 2:
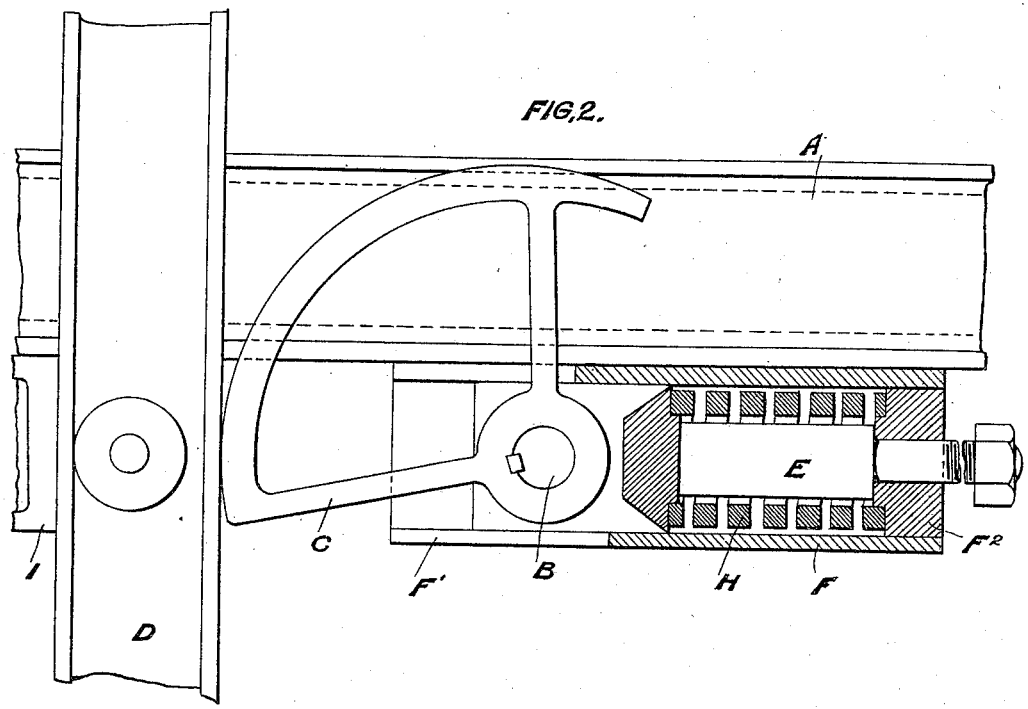
Figure 3:
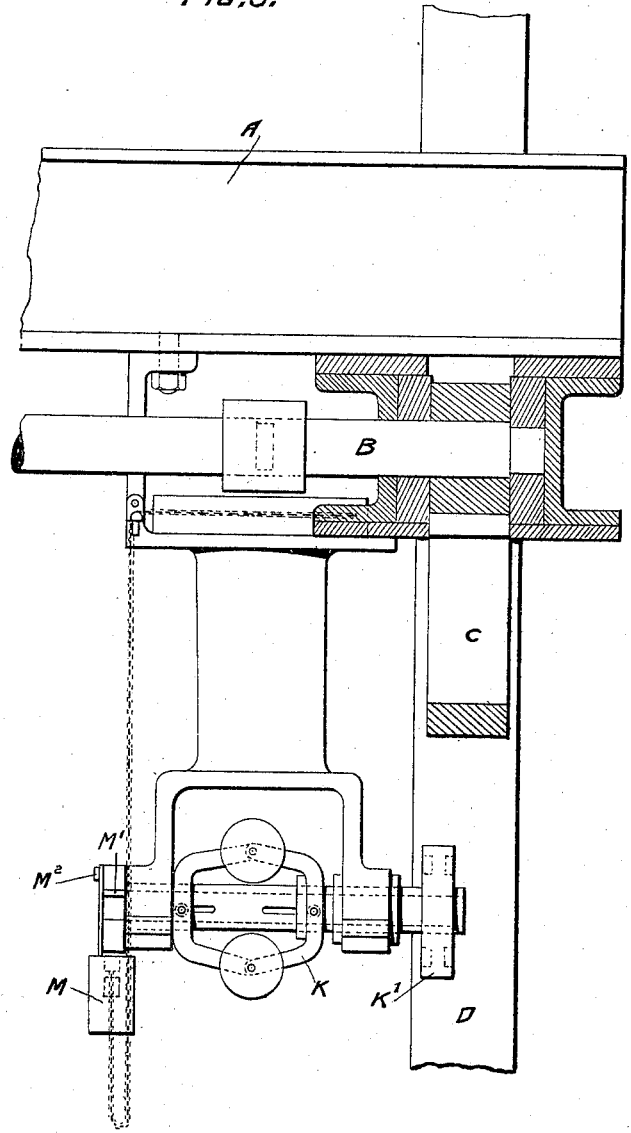
Figure 4:
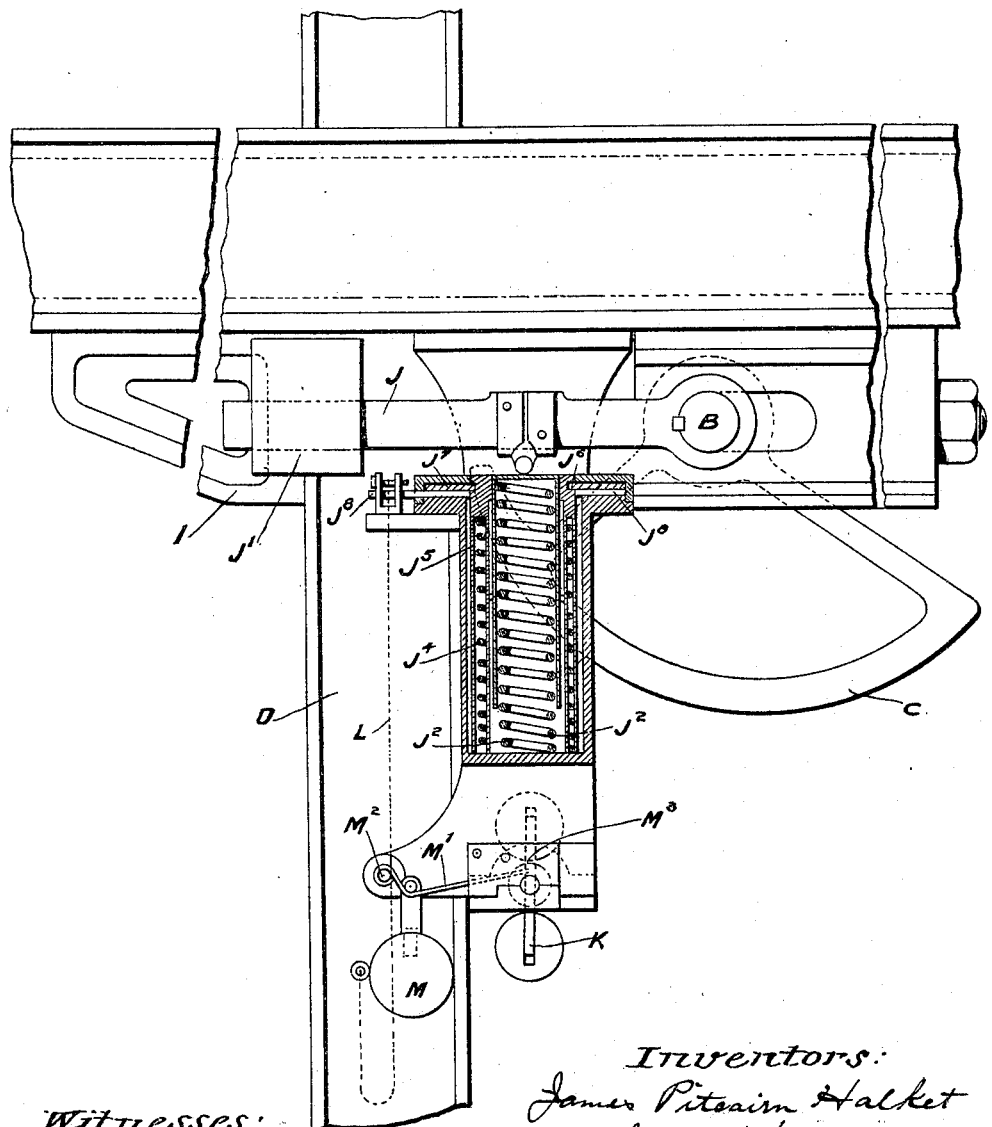
Figure 5:
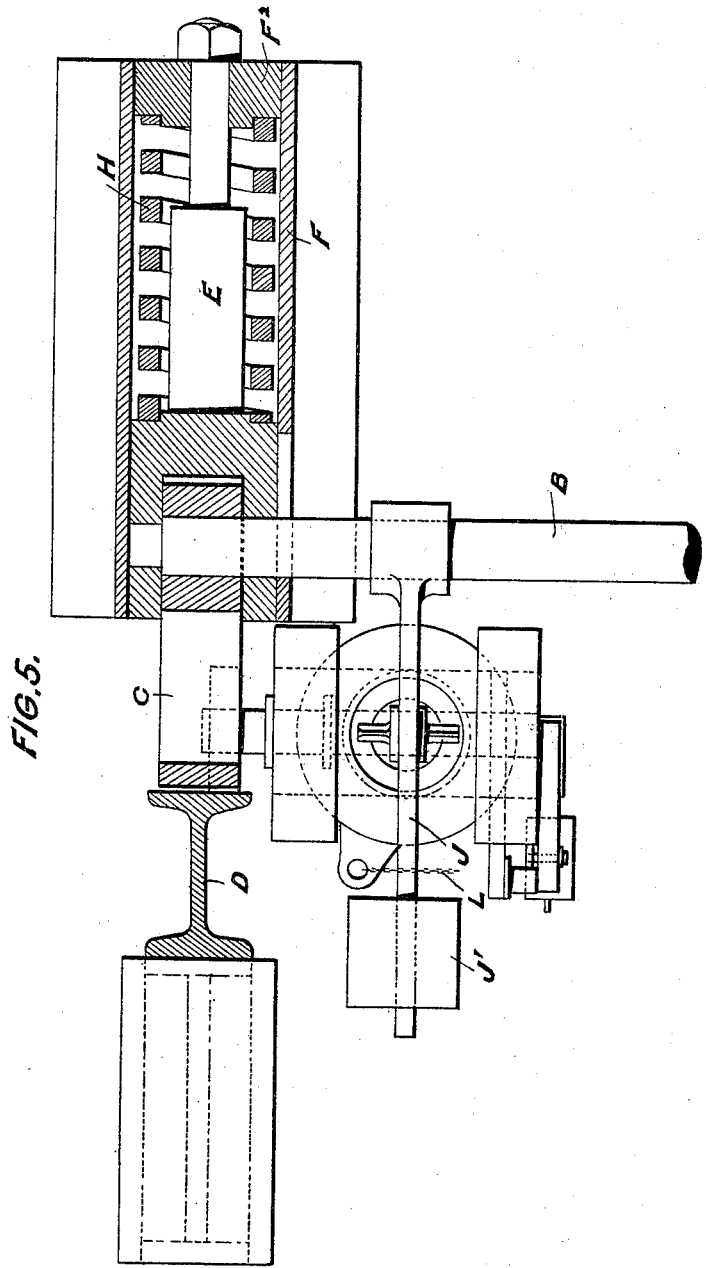
Figure 6:
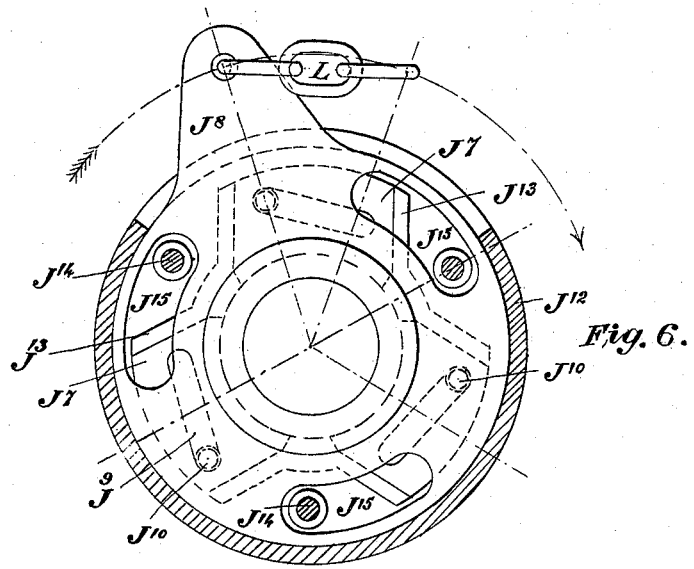
Figure 7:
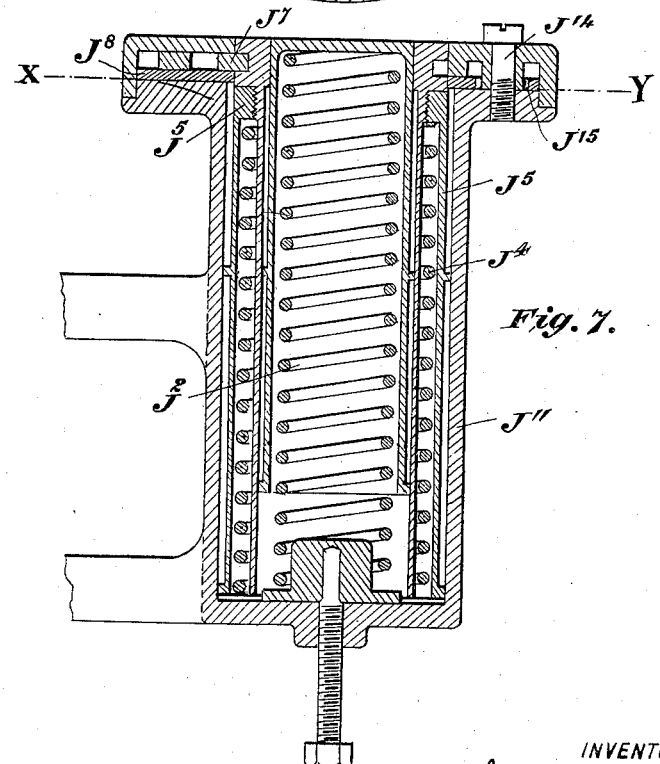

Referring to the accompanying five sheets of drawings, Figure 1 is an elevation showing the first modification of our invention with the cams C in the normal position before coming into action. Fig. 2 is another elevation of the same, but with the cams C in gear with the guides D and showing the bolster E pushed solidly home against the end F² of the spring-box F. Fig. 3 shows a front elevation, partly in section, of a modified form of our invention. Fig. 4 shows a side elevation of the same, but with the double-spring box in section. Fig. 5 shows a plan of the same, partly in section. Fig. 6 is an inverted section of the spring-box and iris diaphragm device on the line X Y of Fig. 7. Fig. 7 is an enlarged sectional elevation of the spring-box and iris diaphragm device.

In carrying our invention into effect according to one modification, as illustrated in Figs. 1 and 2, where the cams are operated by the inertia of a mass on a lever fixed to the cam-shaft, we provide a cross-shaft B, suitably supported, preferably, on the bottom of the cage A. This shaft carries two cams C, one at each end. Suitably strong wooden or metal guides D are used to guide the cage. The cam-shaft B is so supported by the bolster E and spring-box F that it can move backward in guides F', attached to the spring-box away from the lift-guides D as the cams C turn into position in gripping the guide D. Springs H are suitably placed to resist this backward motion and are of sufficient strength to absorb the energy of motion in the cage and load when the apparatus comes into action and to arrest the fall of the cage without dangerous shock. Instead of the springs H a hydraulic buffer of any of the well-known types may be used. The cams C grip the guides D against suitable brackets I, fixed on the cage-bottom. A weight J' is placed on a lever J, fixed to the cam-shaft B, (see Figs. 3, 4, and 5,) and this weight J' is held up, as shown, by the spring J². When a sudden downward acceleration is given to the cage, as by the breaking of the supporting ropes or ram in any way, the inertia of the weight J' on the weight-lever J prevents its at once taking up this suddenly-increased speed, and the cam-supporting spring J², acting through the lever J, brings the cams C into engagement with the guides D. The cams C then roll on the guide-surfaces, compressing the buffer-springs H, which gradually absorb the energy of motion, just as in a gun the energy of recoil is sometimes absorbed by springs. A stop F² is provided, against which the spring cross-head or bolster E bears solidly when the limit of travel of the spring has been reached. The strength of springs and the travel of the cage after engagement with the guides should be so protioned that no severe shock is caused by the stoppage of the lift in this manner. The cam-surfaces may be toothed, so that no slipping can take place between them and the guides. If a plain metal guide be used, short but sharp and strong teeth are preferable and should be so made that if the guide be lubricated the teeth can penetrate the lubricant and so bite on the guides. Teeth might be provided on the guides also. We may bring the cams C into operation by means of springs, which are under tension or compression by the tension of the cage-carrying ropes, and when this breaks these springs would be set free and would move the cams into engagement with the guides D.

In another modification of our invention, where we use a governor to actuate the cam C, as shown in Figs. 3, 4, and 5, the spring-box and iris diaphragm being shown in further detail in Figs. 6 and 7, we provide a second spring $J^4$, held in compression by a tubular sleeve $J^5$, which has an annular recess $J^6$ at its top, adapted to receive the edges of the plates $J^7$ of an iris diaphragm. The plates $J^7$ are withdrawn by the turning of the plate $J^8$, which has angle-slots into which pins on the plates $J^7$ project. The plate $J^8$ is turned by means of a chain L, attached to the weight M, which falls when released by the governor. The ball-governor K is driven from a pulley K′, engaging by friction or otherwise with the guide D. The weight M is suspended normally by a lever M′, pivoted at $M^2$, and engaging at $M^3$ with the moving part of the governor-sleeve. When the governor-sleeve is withdrawn on account of the cage speed having become excessive, the lever M′ is set free and the weight M falls until checked by the chain L, and therefore turns the plate $J^8$ and sets free the spring $J^4$. This spring $J^4$ then rises and brings the cams into engagement with the guides D, thus stopping the fall of the cage. This governor arrangement acts as a check on the inertia-gear.

In Figs. 6 and 7, the more detailed views of the spring-box and iris diaphragm, the containing-box is marked $J^{11}$ and its cover holding in the iris the diaphragm-plates $J^7$ is marked $J^{12}$. The plates $J^7$ also slide out of and into grooves $J^6$, being guided in the guides $J^{13}$ when the plate $J^8$ is turned in one direction or the other. Pins $J^{14}$ are provided, working in slots $J^{15}$ to limit the travel of the plate $J^8$.

The arrangement last described of actuating the cams by the governor might be advantageously used alone without the inertia-gear, in which case the weight J′ and spring $J^2$ would be omitted, or both may be used together, as shown. The second spring $J^4$ may be operated in other ways from the governor without departing from our invention.

Having thus described our invention, what we claim as new, and desire to secure by Letters Patent, is—

1. In an elevator safety-gear, the combination with the cage-guides and cage, of a cam-shaft carried by the cage, cams secured to said shaft designed to engage the cage-guides, an inertia-weight connected with said shaft, and a spring normally counterbalancing said weight, substantially as described.

2. In an elevator safety-gear, the combination with the cage-guides and cage, of a cam-shaft carried by the cage, cams secured to said shaft designed to engage the guides, a weighted arm carried by the cam-shaft designed to normally hold the cams out of engagement with the guides, a spring located beneath said weighted arm designed to exert an upward pressure on the same to force the cams into contact with the guides, means for holding said spring normally inactive, and a governor for releasing said holding means, substantially as described.

3. In an elevator safety-gear, the combination with the cage and cage-guides, of a cam-shaft carried by the cage, cams carried thereby adapted to engage the guides, a weighted arm or lever carried by said shaft, a spring-pressed sleeve adapted to exert an upward pressure on said lever, retaining means for holding said sleeve normally depressed against the tension of the spring for operating said retaining device, and a governor operated by the movement of the cage for releasing said weight, substantially as described.

4. In an elevator safety-gear, the combination with the cage-guides and cage, of the shaft journaled in transversely-yielding bearings, the cams carried by said shaft and means for rotating said shaft to cause the cams to engage the guides on the dropping of the cage, substantially as described.

In witness whereof we have hereunto set our hands in presence of two witnesses.

JAMES P. HALKET.
JOHN KENNEDY.

Witnesses:
ALBERT E. PARKER,
M. ATKINSON ADAMS.